United States Patent [19]

Udvardi-Lakos et al.

[11] 4,079,443
[45] Mar. 14, 1978

[54] CIRCUIT ARRANGEMENT FOR STARTING UP A CONVERTER HAVING FORCED COMMUTATION WITH CORRECT PHASE

[75] Inventors: Janos Udvardi-Lakos, Erlangen; Wolfgang Meissen, Tennenlohe near Erlangen, both of Germany

[73] Assignee: Siemens Aktiengesellschaft, Munich, Germany

[21] Appl. No.: 709,701

[22] Filed: Jul. 29, 1976

Related U.S. Application Data

[62] Division of Ser. No. 617,157, Sep. 26, 1975.

[30] Foreign Application Priority Data

Jul. 30, 1975 Germany .............................. 2534102

[51] Int. Cl.$^2$ .......................................... H02M 7/515
[52] U.S. Cl. ...................................... 363/49; 307/66; 363/138
[58] Field of Search ................. 307/64, 66; 321/45 C, 321/45 S; 363/49, 135, 138

[56] References Cited

U.S. PATENT DOCUMENTS

| | | | |
|---|---|---|---|
| 3,401,327 | 9/1968 | Leppert | 321/45 S |
| 3,703,644 | 11/1972 | Thorborg | 307/64 |
| 3,818,272 | 6/1974 | Rich | 307/66 |

Primary Examiner—William H. Beha, Jr.
Attorney, Agent, or Firm—Kenyon & Kenyon, Reilly, Carr & Chapin

[57] ABSTRACT

This invention relates to an inverter adapted to a fast start-up, preferably an inverter for power plants free from interruption. In the commutation devices of the valve branches of the inverter, there are two commutation capacitors which in stand-by are charged through chargers of opposite polarity. Upon receipt of a start-up order, the ignition pulses of a concurrent control device are released and by the first commutation, the commutation capacitor being switched on in the commutation device of the first commutating valve is the one the pre-charge of which has the required proper polarity. During further operation the two commutation capacitors are operated in parallel.

3 Claims, 17 Drawing Figures

CIRCUIT ARRANGEMENT FOR STARTING UP A CONVERTER HAVING FORCED COMMUTATION WITH CORRECT PHASE

This application is a divisional application of application Ser. No. 617,157, filed Sept. 26, 1975.

BACKGROUND OF THE INVENTION

1. Field of the Invention

The invention pertains to a method for starting-up, with the correct phase, a converter having forced commutation and comprising a power stage having controlled main valves and commutation devices associated with these valves, and a control apparatus which includes a drive unit synchronized with a power line voltage for generating firing pulses which is preceded by a regulating device. The invention further pertains to apparatus for implementing such a starting-up method.

In known static converters of the above type, the starting-up process takes a certain amount of time, as the commutation devices employed therein are initially uncharged and, therefore, cannot immediately quench the full valve currents. Customarily, the output voltage of the converter is, therefore, raised gradually by appropriately changing the firing angle of the firing pulses, starting from a small initial value up to the nominal value of the output voltage of the converter. This process extends over several commutation processes and thus is disadvantageous particularly in converters in which a fast load take-over is required. Such is the case, for example, if the converter, as a supplemental power unit, is to cover demand peaks of a power system or if the converter is used in an interruption-free power supply installation, in which a load is supplied in normal operation directly from a power system and in emergency operation from a substitute power source via an inverter.

It is therefore an object of the present invention to provide a method and a circuit arrangement for starting-up a static converter by means of which such starting-up occurs with the correct phase and in an extremely short time.

SUMMARY OF THE INVENTION

The above and other objectives are accomplished in accordance with the principles of the invention by providing in the commutation devices of the converter two energy storage devices which are connected with a charging device and are charged in the stand-by position with opposite polarities and which are connected parallel in power operation. In this case, the firing pulses are released in such a manner that those main valves are fired immediately which are associated with the polarity of the output voltage of the converter which is required at the stating instant. In particular; for the first commutation of a converter valve, that energy storage device is switched to the respective commutation device, whose precharge has the correct polarity for quenching the valve. From the next commutation on, the two energy storage devices in the commutation devices are always connected together during the commutation processes.

The above arrangement of the present converter can be realized by providing, in the commutation devices for the converter valves, two commutating capacitors which are charged in the stand-by position, via charging devices, with opposite polarities and which are connected parallel in power operation. In the aforesaid pre-charging operation, the charging voltage for each commutating capacitor is advantageously chosen higher than the commutation voltage occurring in power operation. As a result, sufficient energy for quenching the full valve current is immediately available for the first commutation.

BRIEF DESCRIPTION OF THE DRAWINGS

The above and other aspects and features of the present invention will become more apparent upon reading the following detailed description in conjunction with the accompanying drawings in which:

FIG. 8b shows typical waveforms appearing in the inhibitor stage of FIG. 8a;

FIGS. 9b, 9c and 9d illustrate waveforms appearing in the converter of FIG. 9a;

FIG. 9e shows a circuit arrangement for controlling the converter of FIG. 9a to realize the waveforms of FIGS. 9c and 9d FIGS. 9f and 9g show further waveforms for the converter of FIG. 9a;

DETAILED DESCRIPTION

Figure 1:
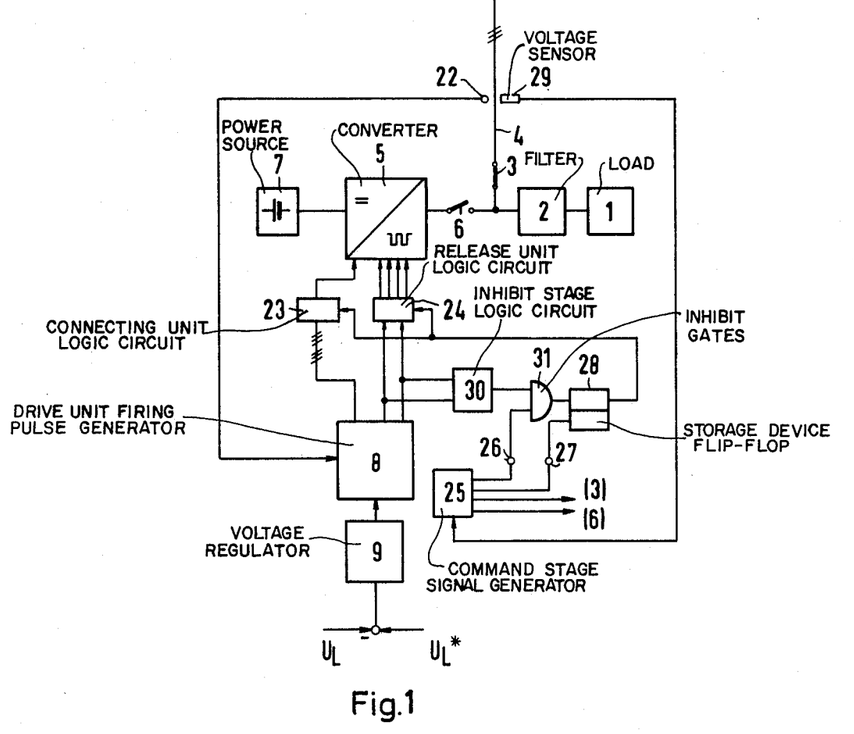
FIG. 1 shows a circuit arrangement including a converter according to the present invention.

FIG. 1 illustrates an embodiment of the invention. As shown, a load 1 is connected via a filter 2 and a power line switch 3 either to a power system 4 or to the output of a converter 5, the latter converter being supplied from a substitute power source 7. The converter 5 is controlled by firing pulses of a drive unit 8 which is synchronized via a synchronization tap 22 with the line voltage of the power system 4. The latter firing pulses are coupled from the drive unit 8 to converter 5 via a connecting unit 23' and a release unit 24. A regulating device 9 feeding the drive unit 8 in the form of a voltage regulator is acted upon in a known manner by a reference voltage $U_L^*$ and the actual load voltage value $U_L$. Associated with the regulating device 9 is, preferably, a servo follow-up device which ensures that the output voltage of the regulating device 9 has the correct value at the beginning of start-up instant of the converter 5. The latter follow-up device is not specifically shown in order not to over-complicate the drawing.

For controlling the starting process, a command stage 25 is provided, which is connected on the input side with a voltage measuring sensor 29 which senses the line voltage of the power system 4. While not shown, the command stage can be addressed also by other measured quantities. In the event of a dip in the line voltage, the command stage 25 generates a starting signal. The starting signal appears at the terminal 26 and sets a storage device 28, whose output signal operates the connecting unit 23 causing the latter to release the firing pulses of the drive unit 8 to the converter 5. When the line voltage recovers, the command stage 25 generates a reset signal at the terminal 27 for the storage device 28. The command stage 25 furthermore controls the power line switch 3 and the switch 6 in the output of the converter 5.

Figure 2:
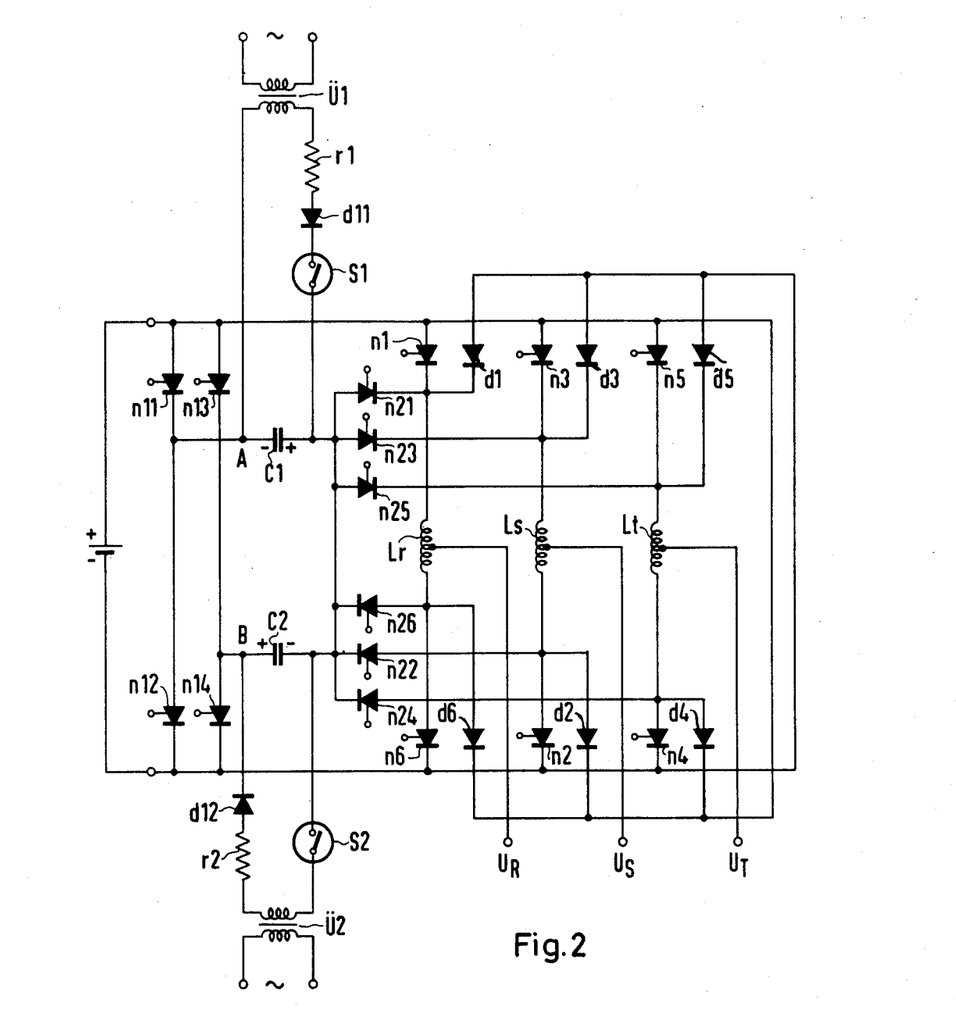
FIG. 2 shows in greater detail the converter of FIG. 1.

In FIG. 2 the internal circuitry of the converter in FIG. 1 is shown in detail. In FIG. 2, the main valves of the converter are designated as $n1$ to $n6$ and the bypass diodes, which are connected antiparallel to them, as $d1$ to $d6$. The commutation devices of the converter include the quenching valves $n21$ to $n26$ and the commutating capacitors C1 and C2. The phase voltages $U_R$, $U_S$, $U_T$ of the converter appear at the chokes $Lr$, $Ls$, $Lt$.

Figure 6:
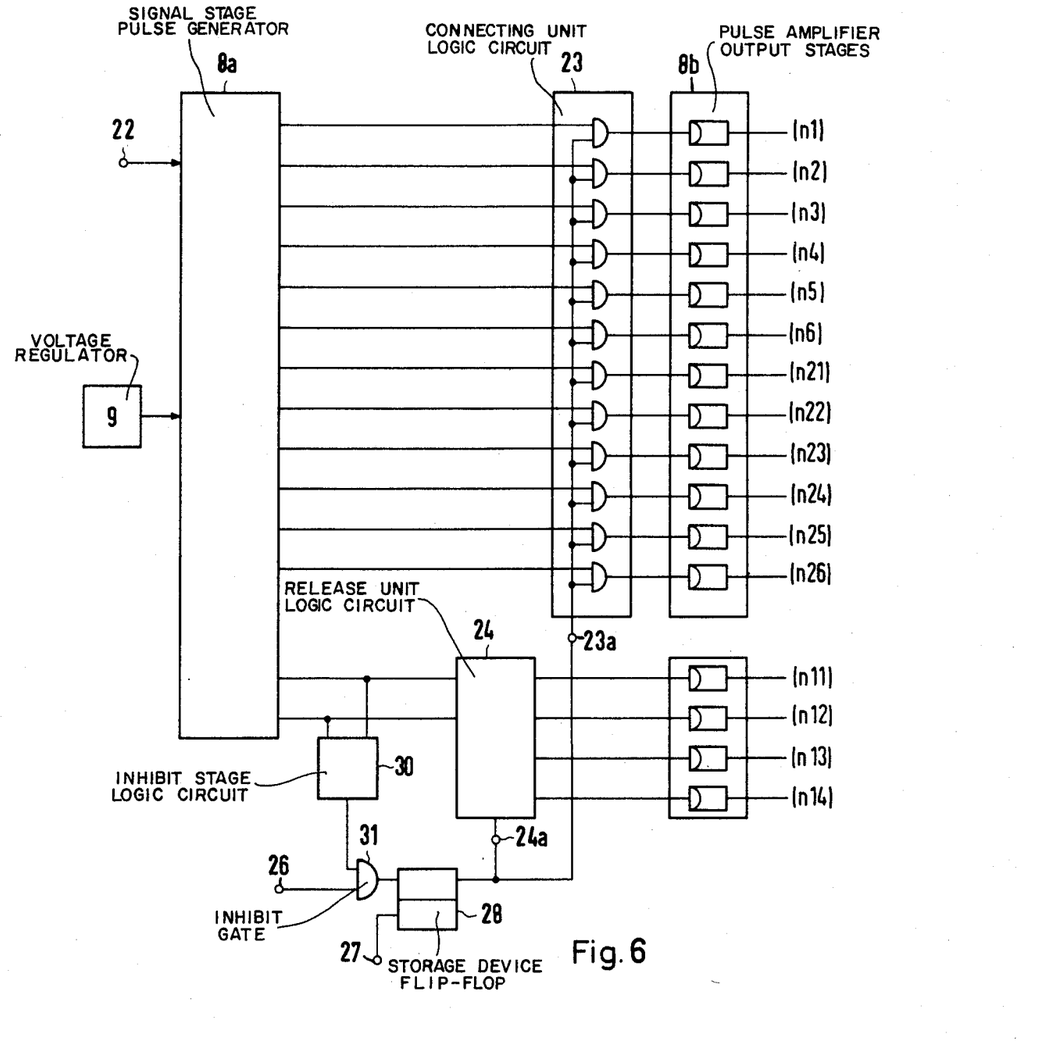
FIG. 6 shows in greater detail the portion of the circuit arrangement of FIG. 1 for controlling firing pulses for the converter of the circuit.

As can be appreciated, contrary to known converter circuits with sum quenching, which have only a single commutating capacitor, the converter FIG. 6 comprises two commutating capacitors C1 and C2 each having an associated charging device. The charging device for the commutating capacitor C1 includes a transformer $U_1$ connected to an a-c voltage source, a diode $d11$ which acts as a rectifier, a resistor $r1$ and a switch S1. This charging device chrges the commutating capacitor C1 in the stand-by position to a voltage with the polarity indicated, the value of the latter voltage being higher than the commutation voltage occurring in power operation.

The charging device for the commutating capacitor C2 is similarly constructed and includes a transformer $U_2$, a diode $d12$, a resistor $r2$ and a switch S2. If the resistance values of $r1$ and $r2$ are chosen to be appropriately large, the switches S1 and S2 of the charging device can be dispensed with. In such case, the two commutating capacitors would then be connected to the charging devices in normal, as well as, emergency, operation. However, to provide a clearer explanation of the principles of the invention, operation of the charging device will be described assuming the presence of the switches S1 and S2, which are opened upon a starting command.

The commutating capacitors C1 and C2 are designed so that each has only half the capacity that would be required for sum quenching with a single commutating capacitor. Thus, the additional circuitry needed as a result of their use is justifiable. The capacity of the commutating capacitors is determined from the rated power of the converter and the currents in the valves.

The circuit arrangement of FIG. 2 is also provided with controlled auxiliary valves $n11$ to $n14$. Through suitable control of these auxiliary valves, one of the two commutating capacitors C1 or C2 can be switched to the particular main valve which is to be extinguished for the first commutation. For the following commutations, the two commutating capacitors can be operated in parallel through appropriate control of the auxiliary valves.

Figure 3:
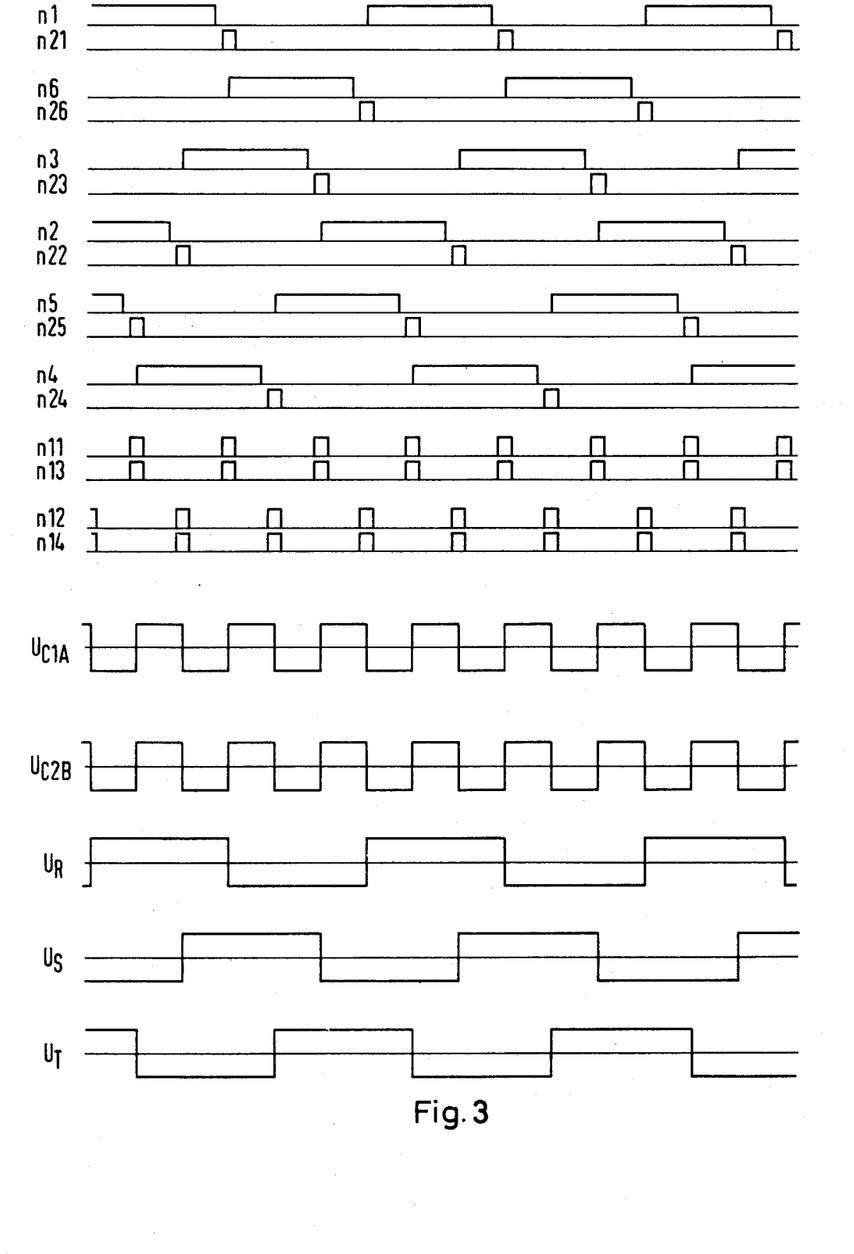
FIGS. 3 to 5 illustrate typical waveform appearing in the converter of FIG. 1.

FIG. 3 shows firing pulses for the normal operation of the inverter of FIG. 2. In particular the firing pulses for the controlled main valves $n1$ to $n6$, the controlled auxiliary valves $n11$ and $n13$ are illustrated. As can be seen, the quenching valves are always fired subsequently to the conduction period of the associated main valves. The pair of auxiliary valves $n11$ and $n13$ are always fired together, as are the pair of auxiliary valves $n12$ and $n14$, each pair being fired simultaneously with one of the quenching valves $n21$ to $n26$. More specifically, the auxiliary valves $n11$ and $n13$ are fired simultaneously with the quenching valves $n21$, $n23$, $n25$ associated with the main valves $n1$, $n3$, $n5$, while the auxiliary valves $n11$ and $n14$ are always fired simultaneously with the quenching valves $n22$, $n24$, $n26$ associated with main valves $n2$, $n4$, $n6$. In this manner, the two commutating capacitors C1 and C2 are connected in parallel during the commutation processes and, therefore, act as a single commutating capacitor for sum quenching. The voltage waveforms $U_{C1A}$ and $U_{C2B}$ at the points A and B, therefore, have the identical waveforms as shown.

FIG. 3 also shows the phase voltages $U_R$, $U_S$ and $U_T$ of the converter of FIG. 2, the latter voltages having a well known square-wave waveforms.

Figure 4:
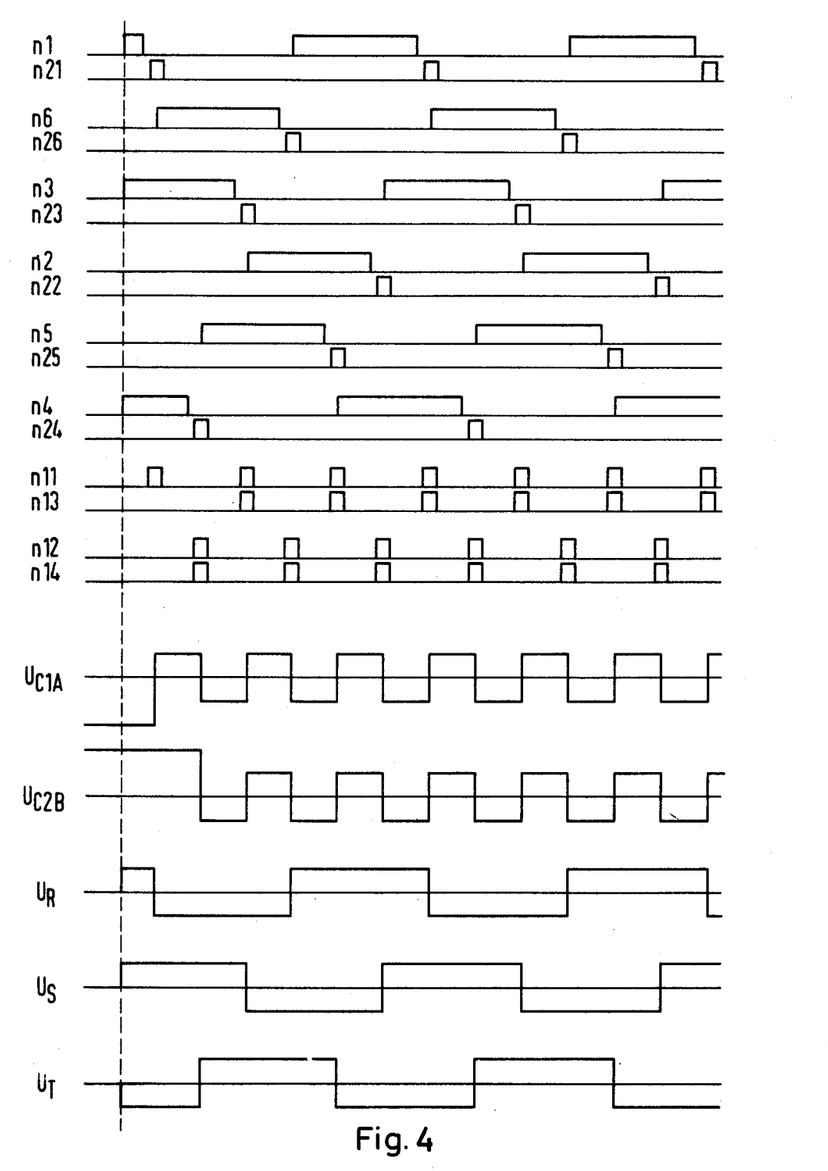

FIG. 4 shows the firing pulses for obtaining a fast start-up of the converter of FIG. 2 with the correct phase at the point in time marked by the vertical dashed line. It is assumed in the following discussion that the drive unit 8 of feeding the converter can be synchronized without delay, with the three-phase line voltage of the power system 4 in the event of a failure of the system. It has also been assumed that such synchronization requires that the phase voltages $U_R$ and $U_S$ have positive polarity at the starting instant and that the phase voltage $U_T$ has negative polarity at the starting instant.

Prior to starting, the two commutating capacitors C1 and C2 are charged in the stand-by position with different polarities, as the waveforms of the voltages $U_{C1A}$ and $U_{C2B}$ at the points A and B make clear. The pre-charge voltage is higher than the voltage occurring during operation of the inverter.

At the starting instant, the firing pulses of drive unit 8 are released to all valves with the exception of the valve $n13$. As a result, the main valves $n1$, $n3$ and $n6$ are fired. The first commutation process takes place at the main valve $n1$ through the firing of the associated quenching valve $n21$. At the same time, also the auxiliary valve $n11$ is fired. Thus, the commutating capacitor C1 is effective for the first commutation. For all subsequent commutation processes, the auxiliary valves $n11$ and $n13$ or $n12$ and $n14$, respectively, are then fired together. Consequently, the commutating capacitors C1 and C2 operate in parallel during the subsequent commutation processes and thus function as a single commutating capacitor for sum quenching.

Figure 5:
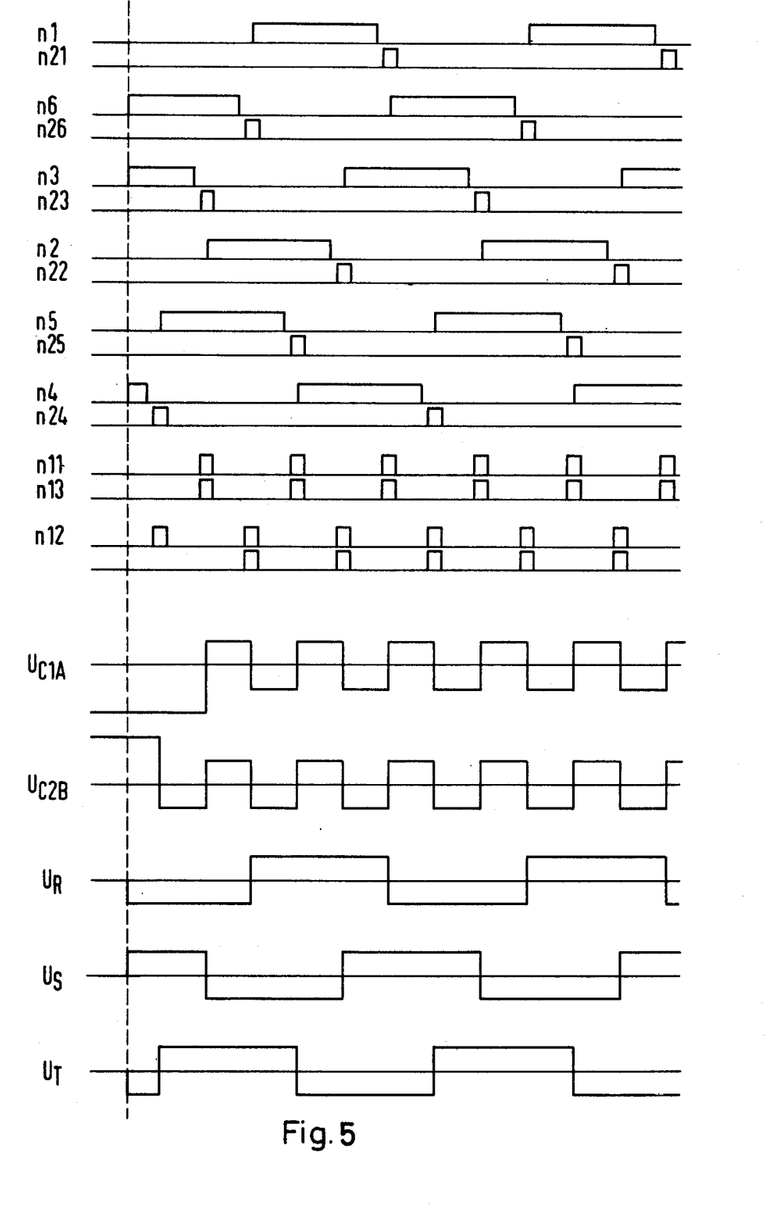

In FIG. 5, the firing pulses for the inverter of FIG. 2 are shown for the case in which the voltages $U_R$ and $U_T$ are to have a negative polarity and the phase voltage $U_S$ a positive polarity at the starting instant. In this case, the first commutation takes place at the main valve $n6$ by firing the associated quenching valve $n26$. Simultaneously with the quenching valve $n26$ the auxiliary valve $n14$ is fired. The first commutation of the main valve $n6$, therefore, takes place with the aid of the capacitor C2. In all subsequent commutation processes, the auxiliary valves $n11$ and $n13$ or $n12$ and $n14$, respectively, are again fired together. Thus, the two commutating capacitors operate in parallel for all subsequent commutation processes and thus again, act as a single commutating capacitor for sum quenching.

FIG. 6 shows in greater detail the portion of the circuit of FIG. 1 which controls the generation of the firing pulses shown in FIGS. 4 and 5.

As shown, the signal stage 8a and pulse output stages 8b forming part of the drive unit 8 of FIG. 1 are fed by the voltage regulation device 9 which determines the firing angle of the firing pulses of the unit.

The firing pulses of the signal stage 8a for the controlled main valves n1 to n6 and the controlled quenching valve n21 to n26 in the valve branches of the converter are coupled through the connecting unit 23' and appear at the outputs of the output stage 8b. The valves fed by the aforesaid outputs are indicated, in parantheses adjacent their respective outputs. The firing pulses for the controlled auxiliary valves n11 to n14 in turn, are coupled through the release unit 24. As in the embodiment of FIG. 1, the latter unit and the connecting unit 23 are arranged ahead of their respective amplifier output stages so that the signal processing can be performed at a low power level.

In the stand-by position of the convert 5, the signal stage 8a and the regulating device 9 are operative. However, at this time, the transmission of the firing pulses to the controlled main valves n1 to n6 and to the controlled quenching valves n21 to n26 is blocked by the connecting unit 23', while the transmission of the firing pulses to the controlled auxiliary valves n11 to n14 is blocked by the release unit 24.

In order to ensure that the firing pulses are released during a commutation process or immediately before a commutation process, an inhibit stage 30 is also provided. The inhibit stage 30 may be acted upon either by the firing pulses generated for the controlled quenching valves n21 to n26 or, as shown, by the simultaneously generated firing pulses for the controlled auxiliary valves n11 to n14.

If the command stage 25 transmits a starting command to the terminal 26, the setting input of the storage device 28 is addressed via an inhibit gate 31, provided the inhibit stage 30 is not generating an inhibit signal. If the inhibit stage 30 is generating an inhibit signal, the device 28 can be set only when this inhibit signal disappears. The output signal of the storage device 28 is connected to the input 24a of the release unit 24 and to the input 23a of the connecting unit 23' and when appropriately set, releases the two units. Storage device 28 can also be reset by a resetting signal applied to its lower input terminal 27, for example, if the converter is to be stopped.

Figure 7:
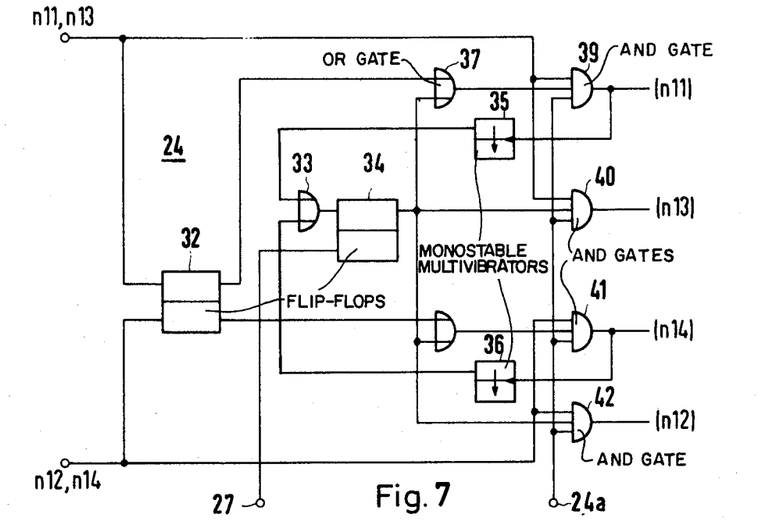
FIG. 7 illustrates the release unit of the converter of FIG. 1 in more detail.

FIG. 7 shows an illustrative circuit configuration for the release unit 24. As discussed above, in emergency operation, as in power operation, the pairs of controlled auxiliary valves n11, n13 and n12, n14, respectively, are fired simultaneously, the drive unit 8 forming one set of firing pulses for the respective pair of auxiliary valves n11, n13 and one set of firing pulses for the respective pair of auxiliary valves n12, n14. As indicated, sets of these firing pulses are fed as inputs to the release unit 24.

The firing pulses for the pairs of auxiliary valves n11, n13 and n12, n14, respectively, determine the polarities of the voltages at the two commutating capacitors C1 and C2 during power operation of the converter 5. These firing pulses are fed, respectively, to the setting input and resetting inputs of flipflop 32. The output signals of the flipflop 32, therefore, have waveforms which correspond to the waveforms of the polarities of the capacitor voltages. If, for example, the upper output of the flipflop 32 carries a "1" signal, the capacitor voltage at the points A and B (FIG. 2) is positive in power operation of the converter. If, on the other hand, the lower output of the flipflop 32 carries a "1" signal, then the capacitor voltage at the points A and B is negative. Moreover, when the signal at the upper output of the flipflop 32 changes from a "0" signal to a "1" signal then the capacitor voltage changes from negative to postitive. In the latter case, only the auxiliary valve n11 need be fired for the first commutation, if the capacitors C1 and C2 are pre-charged as shown in FIG. 2. This firing of the valve n11 only is accomplished by the logic circuit following the flipflop 32. Such circuit includes a further flipflop 34 which is reset prior to the start of converter 5 by a reset signal at its resetting input 27. The output of the flipflop 34 is, therefore, a "0" signal in the stand-by position.

If the drive unit 8a delivers a "1" signal as the firing pulse for the auxiliary valves n11, n13, the flipflop 32 is set. Its upper output thus carries a "1" signal which is coupled via an OR gate 37 to one of the inputs of an AND gate 39, the output of the latter gate being used to feed the control path of the auxiliary valve n11. If a "1" signal is already present as a release signal at the input terminal 24a, a firing pulse is applied to the control path of the valve n11. However, at this time no firing pulse is applied to the control path of the auxiliary valve n13, as the flipflop 34 is not set and, therefore, the middle input of the AND gate 40 is not being appropriately addressed.

The firing pulse being fed to the auxiliary valve n11 is also fed to the pulse input of a monostable multivibrator 35. The decaying flank at the end of the firing pulse causes the monostable multivibrator 35 to deliver a pulse which sets the flipflop 34 via an OR gate 33. The setting of the flipflop 34 then causs the middle and lower inputs of the AND gates 39 and 40, as well as 41 and 42, to be continuously set at "1" signals. As a result, at the outputs of these gates will now appear the respective firing pulses for the auxiliary valves n11 to n14 being delivered by the drive unit.

If at another starting instant the flipflop 32 happens to be, for example, in the reset state then the auxiliary valve n14 is fired first for the first commutation in an analogous manner as discussed for the valve n11. In this case, at the end of the firing pulse for the auxiliary valve n14, the flipflop 34 is now set via a further monostable multivibrator 36 and the OR gate 33. Subsequently, the firing pulses being supplied for the auxiliary valves n11 to n14 by the drive unit are connected through uninhibited to the AND gates 39 to 42 until a reset signal for the flipflop 34 appears at the terminal 27.

Figure 8A:
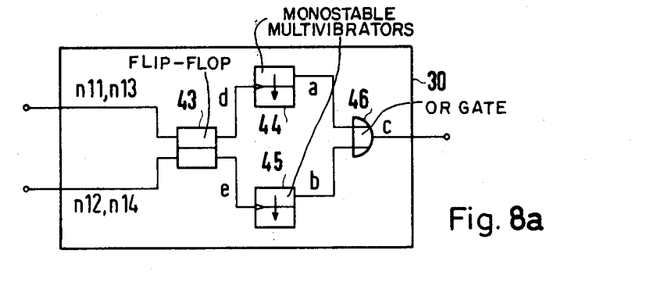
FIG. 8a shows an inhibitor stage which can be employed in the converter of FIG. 1.
Figure 8B:
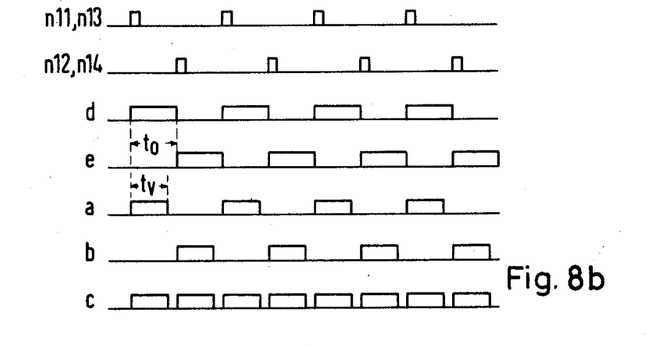

FIG. 8a shows a circuit arrangement which can be employed for inhibit stage 30. As shown, the firing pulses for the controlled auxiliary valves n11, n13 are applied to the setting input and the firing pulses for the controlled auxiliary valves n12, n14 to the resetting input of a flipflop 43. The waveforms of the resultant output signals d and e of the flipflop 43 are shown in FIG. 8b. The output signals d and e are used to trigger monostable multivibrators 44 and 45, respectively, which deliver pulse signals a and b comprising pulses of width $t_v$. As can be seen, the pulse width $t_v$ is shorter than the half-period $t_o$ of the signals d and e. The signals a and b are fed to the inputs of an OR gate 46. The OR gate 46, in turn, produces from the two signals a and b, a signal c which always has the signal state "1" shortly before the start of every commutation process and, therefore, blocks the converter 5 from being started during these intervals.

Figure 9A:
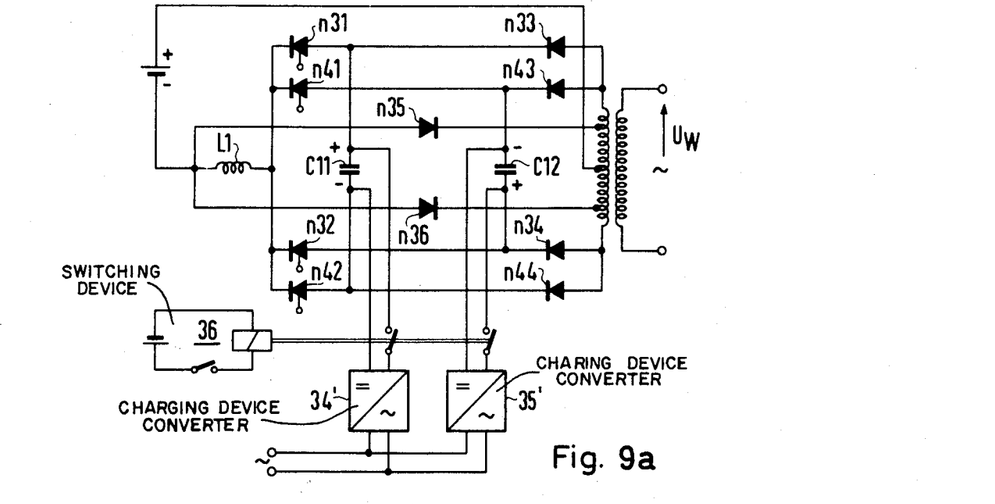
FIG. 9a illustrates another circuit arrangement which can be employed as the converter of FIG. 1.

FIG. 9a illustrates an embodiment of a single-phase converter which can be employed as the converter of an arrangement similar to that shown in FIG. 1. In the converter of FIG. 9a bridge arms with parallel-connected valves are provided for each of the output voltages in order to increase the rated power of the converter. More specifically, the converter comprises an upper bridge arm which includes the series connection of a main valve n31 and a series diode n33 and the parallel-connected series circuit of a main valve n41 and a series diode n43. Simmilarly, the converter also comprises a lower bridge arm which includes the series connection of a main valve n32 and a series diode n34 and the parallel-connected series circuit of a main valve n42 with a series diode n44. With this configuration, the main valves n31 and n41, as well as the main valves n32 and n42, are always fired simultaneously and together. Moreover, the main valves also provide the function provided by the auxiliary valves of the previous converters of connecting the two commutation capacitors C11 and C12 into the circuit. Thus the converter of FIG. 13a causes no extra expenditure for valves.

The converter of FIG. 9a also includes by-pass diodes n35 and n36 and a commutating inductnce L1 which are arranged in a conventional manner. Additionally, the capacitors C11 and C12 of the inverter are provided with associated charging devices 34' and 35' which can be disconneced, in the event of a starting command, by a switching device 36'.

Figure 9B:
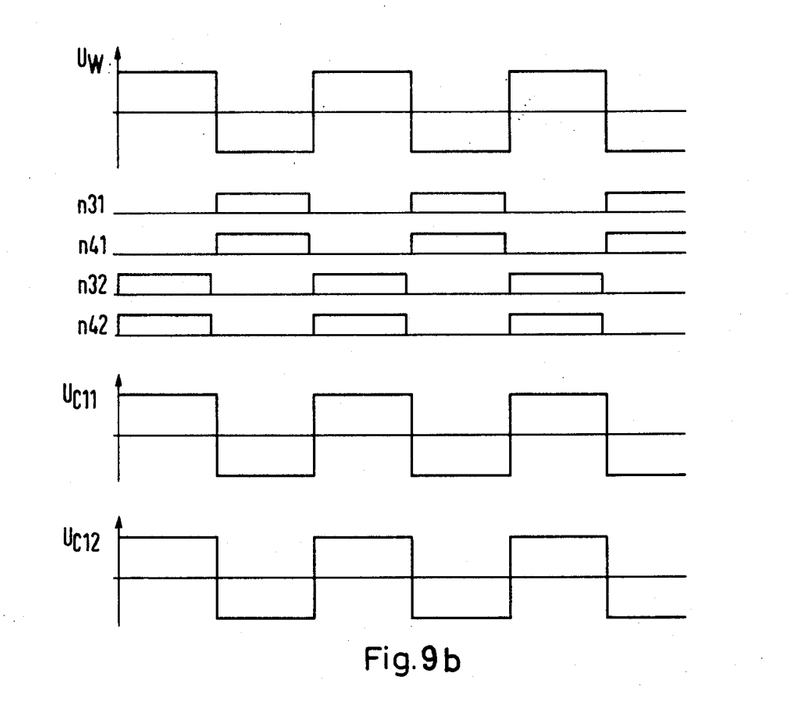

FIG. 9b shows the waveform of the output voltage $U_W$ of the converter of FIG. 9a for normal operation, as well as the pulse waveforms for the firing pulses of the controlled main valves n31, n41 and n32, n42 and the waveforms of the voltages $U_{C11}$ and $U_{C12}$ at the commutating capacitors C11 and C12.

Figure 9C:
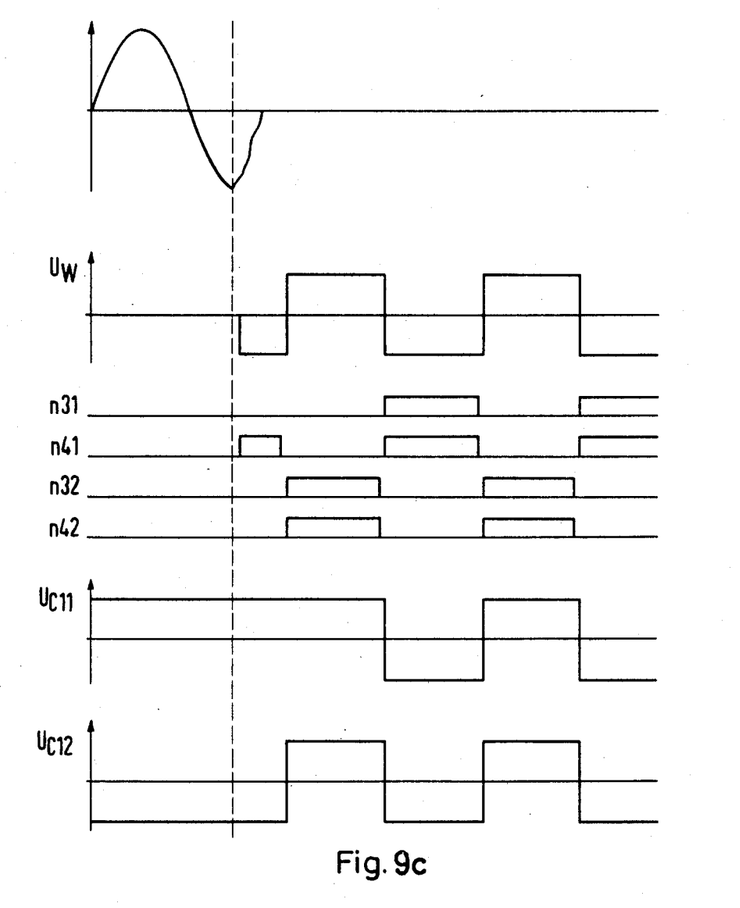

FIG. 9c shows waveforms of FIG. 9b during a cycle of the starting-up of the converter of FIG. 9a when it is used in circuit arrangement similar to that shown in FIG. 1. As can be seen from the waveforms, the commutating capacitors C11 and C12 are charged in the stand-by position with opposite polarities to a normal commutation voltage. During the first commutation after the start, only one of the two commutating capacitors is effective, the commutating ability of the converter during the first commutation being thereby somewhat reduced. Such a reduction is, however, permissible for suitable applications.

As indicated, the line voltage $U_N$ (top waveform in FIG. 9c) breaks down in the negative half-wave. At the time of such breakdown, a starting command voltage of negative polarity is applied to the converter. With the starting command, the drive unit firing pulses which have been generated in stand-by position are now appropriately released with the exception of the firing then present firing pulse for the main valve n31. The output voltage $U_W$ of the inverter is thereby caused to take on the required negative polarity by way of the first commutation which takes place with the charge of the commutating capacitor C12. Thereupon, the two commutating capacitors C11 and C12 operate in parallel.

Figure 9D:
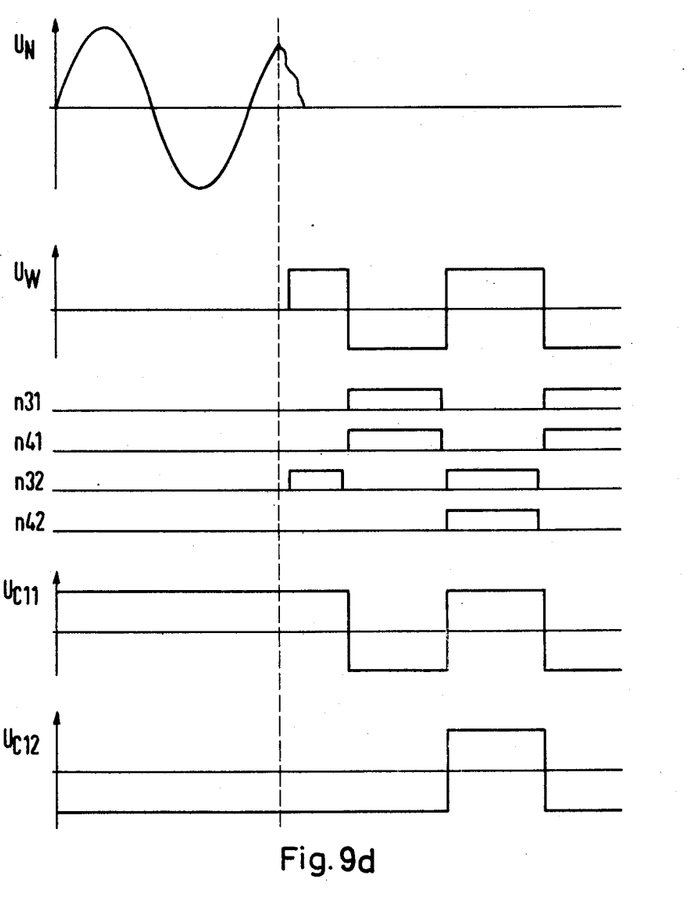

Similarly, FIG. 9d shows the waveforms of FIG. 9b during a start-up of the converter of FIG. 9a for a breakdown of the line voltage $U_N$ during a positive half-wave. Upon a starting command, the firing pulses are released with the exception of the then present firing pulse for the main valve n42. The first commutation takes place with the charge of the capacitor C11. Thereupon, the two commutation capacitors C11 and C12 operate in parallel.

Figure 9E:
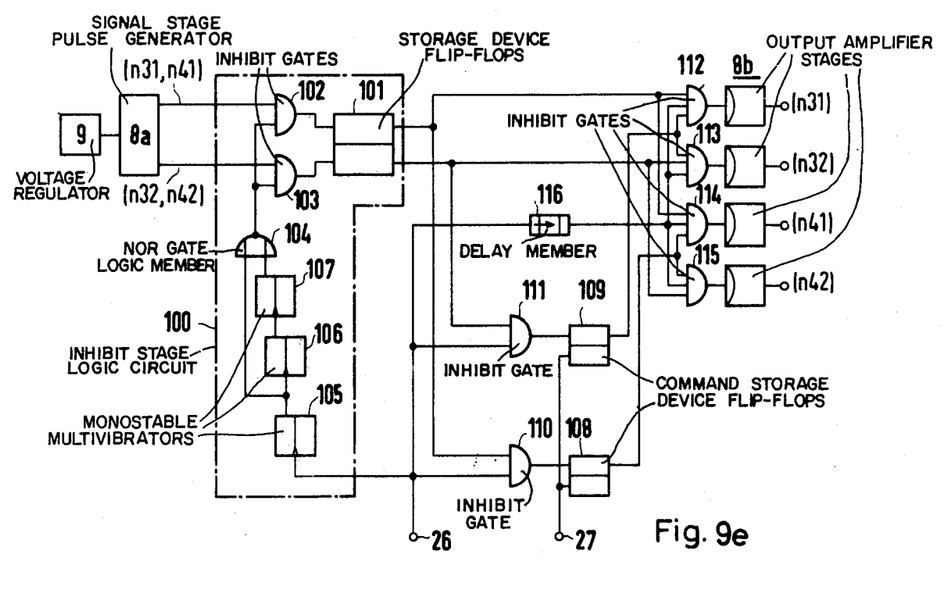

In FIG. 9e a circuit arrangement for controlling the converter of FIG. 9a so as to realize the waveforms of FIGS. 9c and 9d is shown. In FIG. 9e, as in the prior cases, a drive unit is provided which is subdivided into a signal stage 8a and into power output stages 8b. The signal stage 8a is synchronized in a known manner with an a-c voltage system and is fed by regulating device 9 similar to those previously discussed. As the parallel-connected main valves n32, n42 and n32, n42 are always fired simultaneously and together, the signal stage 8a of the drive unit generates common firing signals for n31, n41 and for n32, n42. These firing signals are amplified in the power output stages 8b and coupled therefrom to the respective main valves whose reference symbols are indicated in parantheses.

An inhibit stage 100 prevents commutations from following each other excessively fast, immediately after the starting instant. The inhibit stage 100 includes a storage device 101 whose inputs are fed the outputs of inhibit gates 102 and 103. The inhibit gates 102, 103 can be switched into conduction or can be cut-off by the output signal of a logic member 104, which member is preceded by a delay circuit comprised of three monostable multivibrators 105, 106, 107. The first monostable multivibrator 105 has a pulse duration which is longer than the duration of one commutation and which is approximately 1.5 times the duration of one commutation. The second monostable multivibrator 106 has a pulse width which is substantially shorter than the duration of one commutation, e.g., 1/100 of the duration of one commutation and is, for instance, again 1.5 times as long as the duration of one commutation.

In operation, the positive flank of a starting signal at the terminal 26 releases a pulse from the monostable multivibrator 105 which for its duration blocks new firing pulses from being taken into the storage device 101. The decaying flank of the pulse of the monostable multivibrator 105, in turn, triggers the release of the pulse of the multivibrator 106. For the duration of such pulse, new firing pulses can now be transferred into the storage device 101. The decaying flank of the pulse of the monostble multivibrator 106 then triggers the monostable multivibrator 107, whose output pulse again inhibits the transfer of new firing pulses into the storage device 101. At the end of the latter pulse, the transfer of new firing pulses into the storage device 101 is relesed indefinitely. As can be appreciated, the inhibit stage 100 is advantageous for converters which are controlled by means of firing pulse control methods. Moreover, the stage 100 can in some cases be simplified in such a manner that the monostable multivibrators 106 and 107, as well as the logic member 104, are omitted. In these cases, the transfer is blocked only during the pulse of the monstable multivibrator 105.

In the circuit of FIG. 9e, two command storage devices 108 and 109 are also provided. The setting input of the command storage device 108 is fed, via an inhibit gate 110, by the firing signals for the valves n31, n41, appearing at the upper output of the storage device 101. The setting input of the command storage device 109, on the other hand, is fed, via an inhibit gate 111, by the firing signals for the valves n32, n42. The command storage devices 108 and 109 can additionally be reset by a reset signal at the further input terminal 27, for example, if the converter is to be stopped.

Upon the application of starting command at the terminal 26, the inhibit gates 112 to 115 feeding the power output stages 8b of the drive unit are released by the output signal of a time-delay member 116 having a very short delay time. The time delay member 116 ensures that the release takes place only if the command storage devices 108 and 109 are set. If the output stages 8b of the drive unit have sufficient response delay, the delay member 116 can be omitted.

In the starting-up cycle shown in FIG. 9c, a firing pulse for the valves n31, n41 is present at the starting instant and sets the storage device 101. The upper output of the storage device 101 thus carries a firing pulse which arrives at the upper inputs of the inhibit gates 112 and 114. The inhibit gate 110, in turn, is brought into conduction by the starting command and the command storage device 108 is thereby set. The setting of the command storage device 108 causes its output to place the inhibit gate 14 in the conducting state. The output stage following the inhibit gate 114 thereby receives a firing pulse, as the command storage device 109 is not set. After the first commutation, a firing signal appears for the valves n32, n42. Unless the inhibit stage 100 blocks the new firing pulses from being transferred into the storage device 101, the storage device 101 is reset. The inhibit gate 111 is then made to conduct by the starting command. The command storage device 109 is then set. The output signal of the command storage device 109 places the inhibit gates 112 and 113 in the conducting state. The controlled valves are acted upon by the firing pulses in the usual manner. If the inhibit stage 100 delays the transfer of new firing pulses for a specified time, the starting-up cycle described proceeds thereafter in the same manner. The inhibit stage 100 thus only has the function to see to it that the minimum time between the start and the first commutation and, as the case may be, between a first and second commutation does not fall below a permissible value.

In the starting-up cycle shown in FIG. 9d, the firing pulses for the valves n32, n42 are first present at the output of the storage device 101. In this situation, the starting command places the inhibit gate 111 in the conducting state and the command storage device 109 is thereby first set. The setting of the storage device 109, in turn, causes the inhibit gates 112 and 113 to conduct. As as result, the output stage following the inhibit gate 113 receives a firing pulse for the valve N32. At this time, the valve n42 does not yet receive a firing pulse, as the inhibit gate 115 is still cut off. After the first commutation the inhibit gate 110 is caused to conduct the command storage device 108 is then set and the inhibit gates 114 and 115 are thereby controlled into conduction.

Figure 9F:
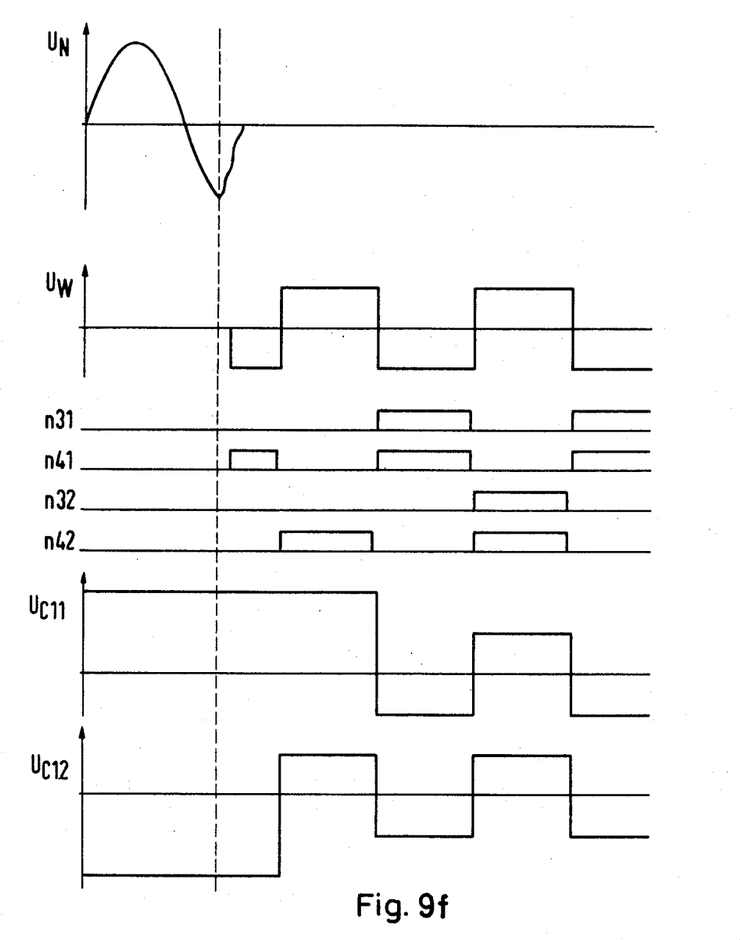

FIG. 9f shows starting-up waveforms similar to those shown in FIG. 9c, with the exception that the two commutating capacitors C11 and C12 are charged in the stand-by position to a voltage higher than that occurring in power operation. In such case, the inverter of FIG. 13a has its full commutating ability for the first commutation.

Figure 9G:
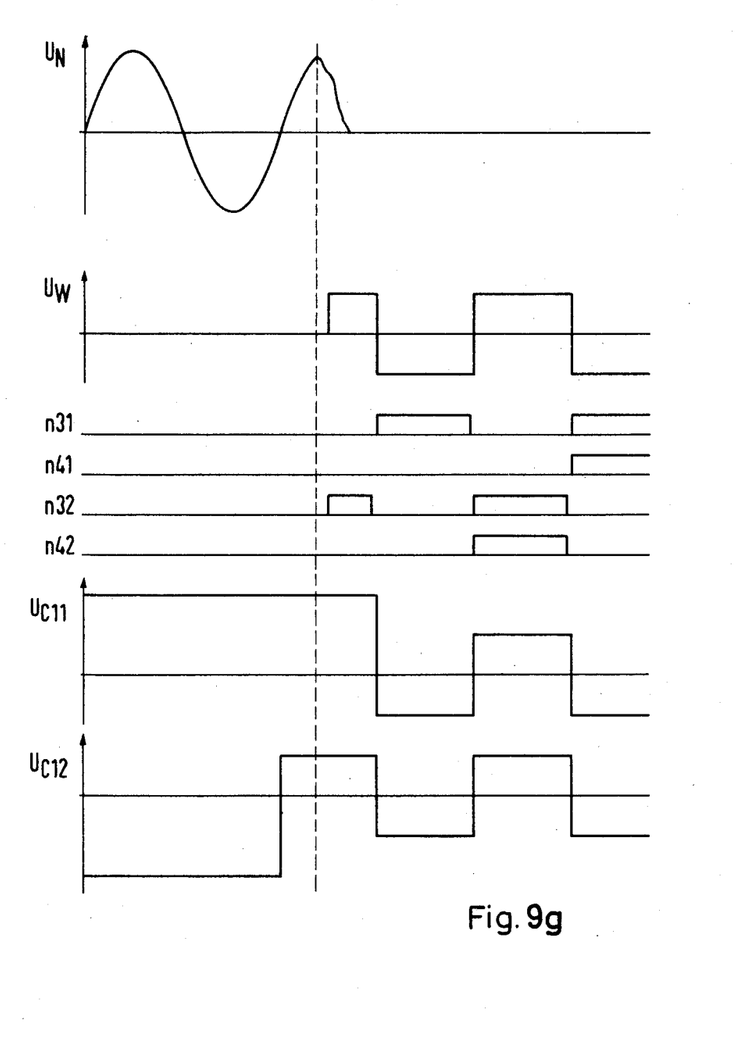

Likewise, FIG. 9g shows a starting-up waveforms similar to those depicted in FIG. 9d, with the exception that the commutating capacitors C11 and C12 are again charged in the stand-by position to a voltage which is higher than the commutation voltage occurring in operation.

Figure 9H:
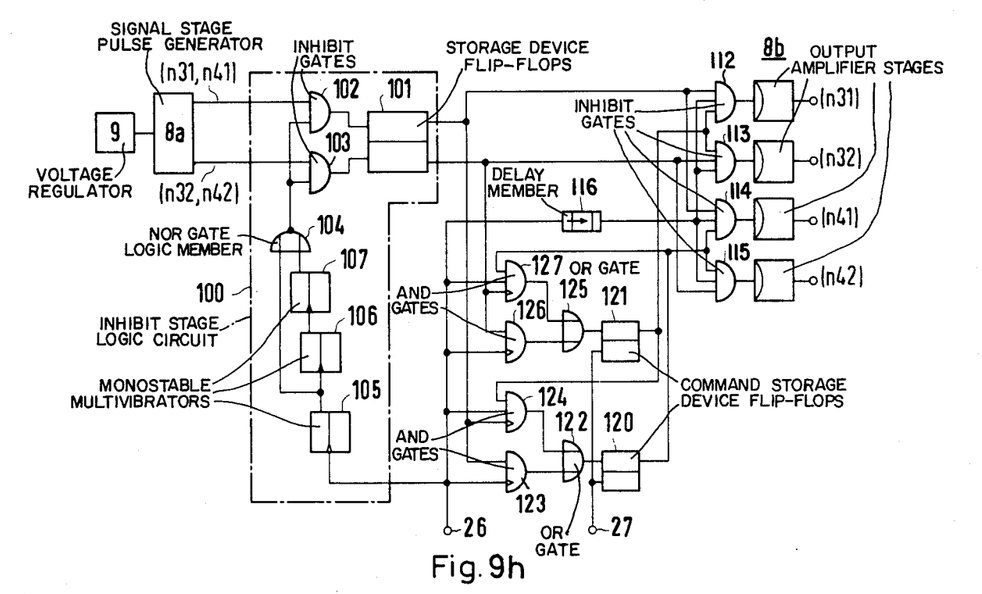
FIG. 9h illustrates a circuit arrangement for controlling the converter of FIG. 9a so as to realize the waveforms of FIGS. 9f and 9g.

A circuit arrangement for controlling the starting-up of the inverter of FIG. 9a to realize the waveforms of FIGS. 9f and 9g is shown in FIG. 9h. The circuit arrangement of FIG. 9h corresponds to that of the arrangement of FIG. 9e with the exception of the circuitry associated with the command storage devices. More specifically, in the circuit arrangement of FIG. 9h, two command storage devices 120 and 121 are provided. The setting input of the command storage device 120 is connected via an OR gate 122 with the output of an AND gate 123 and with the output of an AND gate 124. The device 120 is set if either the firing signals for the valves n31, n41 are present during the appearance of the starting command or if the command storage device 121 is set, the starting command is present and the rising flank of the firing signal for the valves n31, n41 appears. The setting input of the storage device 121 is similarly preceeded by an OR gate 125 and two AND gates 126 and 127. This storage device is set if the firing signals for the valves n32, n42 are present and the starting command appears or if the storage device 120 is set, the starting command is present and the rising flank of the firing signal for the valves n32, n42 appears. Additionally, the command storage devices 120 and 121 can be reset by a stop command at the further input terminal 27, for example, if the converter is to be stopped.

What is claimed is:

1. A converter circuit arrangement comprising: a power stage including:
   controlled main valves;
   commutation means associated with said valves, said commutation means comprising two energy storage devices;
   a charging means for charging said energy storage devices to opposite polarities during stand-by position of said converter circuit;
   means for providing for commutation of the energy of the energy storage device whose polarity is associated with the valve whose firing pulse is being generated;
   and means for connecting said energy storage devices in parallel during power operation of said converter;
   and a continuously running control apparatus for controlling said power stage including:
   a drive unit for generating firing pulses and adapted to be fed by a regulating device;
   and a starting device adapted to receive a starting command and including a first release unit for controlling the releasing of said firing pulses to said valves.

2. An arrangement according to claim 1 in which:
   each of said energy storage devices includes a capacitor;
   said charging means includes two charging units, each of which charges a different one of said capacitors during stand-by position to a voltage above the commutation voltage occuring in power operation;
   and said means for connecting connects said capacitors in parallel during power operation.

3. An arrangement in accordance with claim 1 in which:
   said commutation devices include quenching valves associated with said main valves;
   said power stage includes auxilliary valves associated with said energy storage devices;
   said first release unit controls the release of firing pulses to said quenching valves;
   said starting device includes a second release unit for controlling the releasing of firing pulses to said auxilliary valves;
   and upon the receipt of a starting command at said starting device, said first release unit is caused to release said firing pulses and said second release unit operates such as to make available for the first commutation the energy of the energy storage device having the appropriate polarity therefor.

* * * * *